United States Patent Office 3,019,224
Patented Jan. 30, 1962

3,019,224
6-THIOCYANOPURINES AND METHOD OF THEIR PREPARATION
George H. Hitchings, Yonkers, Gertrude B. Elion, Bronxville, and Lottie E. Mackay, Pleasantville, N.Y., assignors to Burroughs Wellcome & Co. (U.S.A.) Inc., Tuckahoe, N.Y., a corporation of New York
No Drawing. Filed Nov. 18, 1959, Ser. No. 853,685
Claims priority, application Great Britain Mar. 25, 1955
4 Claims. (Cl. 260—252)

This invention relates to a novel group of cyano purines and methods for their preparation. In particular, the invention comprises compounds of the formula:

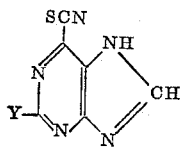

wherein Y is selected from the class consisting of hydrogen and amino.

The derivatives may be conveniently prepared by the reaction of a 6-halogen purine with a metal cyanide in an inert solvent. The resulting derivative can then be readily converted to form amino and amino alkyl derivatives, which can then be hydrolyzed to form amides, carboxylic acid and ester derivatives or, alternatively, converted into amidines. This is a continuation-in-part of applications Serial Nos. 375,819, filed August 21, 1953, 525,382, filed July 29, 1955, now abandoned, and 367,772, now Patent 2,746,961.

As indicated below, the compounds herein are useful in the preparation of 6-mercaptopurine and 2-amino-6-mercaptopurine (thioguanine), the utility of which has been established in leukemia treatment.

The following examples are illustrative:

EXAMPLE 1
*6-thiocyanopurine*

6-chloropurine (9 g.) and potassium thiocyanate (6 g.) were dissolved in methanol (200 ml.) and the solution was boiled on the steam bath with a reflux condenser for 5 hours. After cooling the cream-colored precipitate was recovered by filtration and dried (10.9 g.). On recrystallization from hot water, long colorless needles were formed, melting at 207–208°. The thiocyanopurine is converted to 6-mercaptopurine by solution in 2 N sodium hydroxide.

EXAMPLE 2
*2-amino-6-thiocyanopurine*

A mixture of 3 g. of 2-amino-6-iodopurine and 1.26 g. of potassium thiocyanate in 75 ml. of dimethylformamide was allowed to stand at room temperature in a stoppered flask for 3 days. The mixture was poured into 150 ml. of ice water and the precipitate of 2-amino-6-thiocyanopurine (2.2 g.) collected. After recrystallization from hot water, the product showed an ultraviolet absorption maximum at 323 m$\mu$ in dimethylformamide.

EXAMPLE 3
*6-mercaptopurine*

A solution of 3.5 g. of 6-thiocyanopurine in 100 ml. of 0.5 N sodium hydroxide was heated for 5 minutes and then cooled to room temperature. The solution was adjusted to pH 5 with acetic acid and the precipitate of 6-mercaptopurine (2.7 g.) collected.

EXAMPLE 4
*2-amino-6-mercaptopurine*

One gram of 2-amino-6-thiocyanopurine was dissolved in 5 ml. of 1 N sodium hydroxide. After 15 minutes the solution was diluted to 25 ml. and acidified to pH 5 with hydrochloric acid. The precipitate of thioguanine was collected, washed with water and dried in a vacuum desiccator.

What we claim is:
1. 6-thiocyanopurine.
2. 2-amino-6-thiocyanopurine.
3. A method of preparing 2-amino-6-mercaptopurine in which 2-amino-6-thiocyanopurine is dissolved in dilute aqueous sodium hydroxide solution and acid is added to a final pH value of about 5 and recovering the precipitated thioguanine by filtration.
4. A method of preparing 6-mercaptopurine in which 6-thiocyanopurine is dissolved in dilute aqueous sodium hydroxide solution and acid is added to a final pH value of about 5 and recovering the precipitated 6-mercaptopurine.

No references cited.

UNITED STATES PATENT OFFICE
CERTIFICATION OF CORRECTION

Patent No. 3,019,224                                      January 30, 1962

George H. Hitchings et al.

It is hereby certified that error appears in the above numbered patent requiring correction and that the said Letters Patent should read as corrected below.

Column 1, lines 14 to 19, the generic formula should appear as shown below instead of as in the patent:

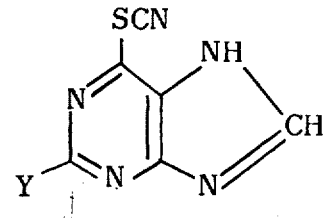

Signed and sealed this 19th day of June 1962.

(SEAL)
Attest:

ERNEST W. SWIDER                                      DAVID L. LADD

Attesting Officer                                     Commissioner of Patents